UNITED STATES PATENT OFFICE.

BAPTIST REUTER, OF HÖCHST-ON-THE-MAIN, GERMANY, ASSIGNOR TO THE FARBWERKE, VORM. MEISTER, LUCIUS & BRÜNING, OF SAME PLACE.

SALICYLATE OF DIMETHYL-AMIDO-PHENYL-DIMETHYL-PYRAZOLONE AND PROCESS OF MAKING SAME.

SPECIFICATION forming part of Letters Patent No. 680,278, dated August 13, 1901.

Application filed July 21, 1900. Serial No. 24,363. (Specimens.)

*To all whom it may concern:*

Be it known that I, BAPTIST REUTER, Ph. D., a subject of the German Emperor, residing in Höchst-on-the-Main, Germany, have invented certain new and useful Improvements in the Manufacture of the Hitherto-Unknown Salicylate of 4-Dimethyl-Amido-1-Phenyl-2.3-Dimethyl-5-Pyrazolone, of which the following is a specification.

I have found that a salt of 4-dimethyl-amido-1-phenyl-2.3-dimethyl-5-pyrazolone may be obtained if salicylic acid is allowed to act on it. I illustrate the manufacture of this salt as follows:

Example I: One hundred and thirty-eight kilos of salicylic acid and two hundred and thirty-one kilos of 4-dimethyl-amido-1-phenyl-2.3-dimethyl-5-pyrazolone are finely pulverized, well mixed, and heated at water-bath temperature till all is dissolved. On cooling the mass solidifies to a crystalline cake, which is pulverized and sifted.

Example II: One hundred and thirty-eight kilos of salicylic acid and two hundred and thirty-one kilos of 4-dimethyl-amido-1-phenyl-2-dimethyl-5-pyrazolone are heated on the water-bath, while eight kilos of alcohol are added until dissolution occurs. When the solution is cold and the crystallization begins, ether is added. Thus a thick crystalline paste is obtained. After filtering and washing with ether the mass is dried in vacuum. The product is in the form of white crystals easily soluble in alcohol and water, soluble with difficulty in ether. The melting-point is 75° to 81°.

The salicylate of 4-dimethyl-amido-1-phenyl-2.3-dimethyl-5-pyrazolone

$$(C_{13}H_{17}N_3O \cdot C_7H_6O_3)$$

thus obtained possesses valuable therapeutic properties.

The salicylate of dimethylamidophenyldimethylpyrazolone dissolved in ten parts of water yields on addition of one cubic centimeter of a solution of normal sodium nitrite a blue-violet coloration, whereas the salicylate of phenyldimethylpyrazolone yields under the same conditions an emerald-green coloration.

Having now described my invention, what I claim is—

1. The herein-described process for the manufacture of salicylate of 4-dimethyl-amido-1-phenyl-2.3-dimethyl-5-pyrazolone, which consists in heating molecular quantities of salicylic acid and 4-dimethyl-amido-1-phenyl-2.3-dimethyl-5-pyrazolone, substantially as set forth.

2. As a new product, the salicylate of 4-dimethyl-amido-1-phenyl-2.3-dimethyl-5-pyrazolone, being a white crystalline body, easily soluble in alcohol and water, soluble with difficulty in ether; melting-point 75° to 81°.

In testimony that I claim the foregoing as my invention I have signed my name in presence of two subscribing witnesses.

BAPTIST REUTER.

Witnesses:
HEINRICH HAHN,
ALFRED BRISBOIS.